United States Patent

Hoppenstedt et al.

Patent Number: 5,224,973
Date of Patent: Jul. 6, 1993

[54] FILTER CARTRIDGE FOR TRAP APPARATUS

[75] Inventors: Bruce B. Hoppenstedt, Bloomington; Wayne M. Wagner, Apple Valley, both of Minn.

[73] Assignee: Donaldson Company, Inc., Minneapolis, Minn.

[21] Appl. No.: 870,939

[22] Filed: Apr. 20, 1992

[51] Int. Cl.⁵ .................. B01D 29/13; B01D 35/18
[52] U.S. Cl. ........................... 55/267; 55/282; 55/DIG. 10; 55/DIG. 30; 219/201; 219/535; 338/208
[58] Field of Search .............. 55/208, 267, DIG. 10, 55/DIG. 30, 269, 282; 219/201, 535, 552, 553; 338/208

[56] References Cited

U.S. PATENT DOCUMENTS

| | | | |
|---|---|---|---|
| 3,149,406 | 9/1964 | Eisler | 219/553 X |
| 3,420,986 | 1/1969 | Pohler et al. | 219/553 |
| 4,040,253 | 8/1977 | Dhugues et al. | 60/303 |
| 4,270,936 | 6/1981 | Mann | 55/520 |
| 4,276,066 | 6/1981 | Bly et al. | 55/287 |
| 4,292,504 | 9/1981 | Gebarowski et al. | 219/552 X |
| 4,355,504 | 10/1982 | Liu et al. | 60/275 |
| 4,450,682 | 5/1984 | Sato et al. | 60/286 |
| 4,456,457 | 6/1984 | Nozawa et al. | 55/283 |
| 4,505,107 | 3/1985 | Yamaguchi et al. | 55/DIG. 10 |
| 4,512,786 | 4/1985 | Sakurai et al. | 55/282 |
| 4,532,164 | 7/1985 | Claunch, II et al. | 219/535 X |
| 4,535,589 | 8/1985 | Yoshida et al. | 60/303 |
| 4,589,938 | 10/1985 | Oishi et al. | 60/286 |
| 4,598,686 | 7/1986 | Lupoli et al. | 55/208 X |
| 4,656,832 | 4/1987 | Yukihisa et al. | 55/DIG. 30 |
| 4,672,809 | 6/1987 | Cornelison et al. | 60/286 |
| 4,686,827 | 8/1987 | Wade et al. | 55/DIG. 30 |
| 4,726,822 | 2/1988 | Cates et al. | 55/267 |
| 4,732,594 | 3/1988 | Mizrah et al. | 55/523 |
| 4,788,819 | 12/1988 | Henkel | 60/303 |
| 4,791,785 | 12/1988 | Hudson et al. | 60/303 |
| 4,811,559 | 3/1989 | Henkel | 60/303 |
| 4,872,889 | 10/1989 | Lepperhoff et al. | 55/267 |
| 4,890,455 | 1/1990 | Leonhard et al. | 60/275 |
| 4,897,096 | 1/1990 | Aischinger et al. | 55/283 |
| 4,925,463 | 5/1990 | Kuhnert | 55/96 |
| 4,974,414 | 12/1990 | Kono et al. | 60/286 |
| 4,976,929 | 12/1990 | Cornelison et al. | 422/174 |
| 4,979,364 | 12/1990 | Fleck | 55/DIG. 30 |
| 4,980,537 | 12/1990 | Knauss | 210/535 X |
| 5,014,511 | 5/1991 | Wade et al. | 60/303 |
| 5,042,249 | 8/1991 | Erdmannsdoerfer | 60/299 |
| 5,044,157 | 9/1991 | Henkel | 60/274 |
| 5,063,029 | 11/1991 | Mizuno et al. | 55/DIG. 30 |
| 5,138,836 | 8/1992 | Pfister | 60/311 |

FOREIGN PATENT DOCUMENTS

| | | |
|---|---|---|
| 0275372B1 | 1/1990 | European Pat. Off. |
| 3800723 | 7/1989 | Fed. Rep. of Germany |
| 2101389 | 3/1972 | France |
| 59-39782 | 5/1984 | Japan |

Primary Examiner—Robert Spitzer
Attorney, Agent, or Firm—Merchant, Gould, Smith, Edell, Welter & Schmidt

[57] ABSTRACT

A filter cartridge with heating element separated from a support member by filter media wherein the heating element has rows of apertures alternately staggered to provide good hoop strength while allowing longitudinal thermal growth and contraction.

8 Claims, 6 Drawing Sheets

FILTER CARTRIDGE FOR TRAP APPARATUS

FIELD OF THE INVENTION

The present invention is directed to filter cartridges, particularly, heaters for filter cartridge configurations used in trap apparatuses for filtering particulates from exhaust gases of usually a diesel engine.

BACKGROUND OF THE INVENTION

A currently popular method of regenerating diesel particulate filters is to use electric resistance heaters. These heaters use the electrical power supply of the engine alternator and batteries to raise the temperature of the filtered particulate matter so that combustion can take place. Large ceramic filters have a relatively high loading capacity and can filter for long periods of time before regeneration is needed. These filters can be regenerated electrically by heating a small portion of the massive filter, and then allowing the regeneration to propagate itself. Larger mass, slow warm-up heater designs can be used because the regeneration duty cycle is very low, and the ratio of heater on-time to loading time is also low. These filters are expensive, and are only cost justified for heavy duty applications.

Diesel filter design concepts for lighter duty applications are moving toward lower cost, lighter weight, modular filter cartridges. These filter cartridges often use a fibrous material that cannot retain enough heat to support self-propagated regenerations. They do not have as much filter media area as ceramic filters, so they require much more frequent regeneration. As such, these filter cartridges require an electric resistance heater that can warm-up very quickly and transfer energy efficiently to the media and the trapped particulate matter. As a consequence, the heater must have exposed elements, must be light weight, must have high surface area for maximum heat transfer, and must be integrated closely with the media and other support structure to enhance heat transfer. Filter cartridge heaters must be partially open to allow unrestricted air flow, and must be able to withstand the extreme thermal stresses associated with close structural contact with other support members. Furthermore, because of the higher regeneration duty cycle, filter cartridge heaters must withstand many thousands of warm-up/cool-down cycles.

Modular filter cartridge design and a multitude of different applications for cartridges require a variety of heater configurations in order to meet power and physical space limitations. Existing heater designs are known by the terms: cal-rod, ribbon, coil, and expanded metal. A cal-rod is essentially an insulative rod containing resistance wire. The rod can be straight or shaped as a spiral or given other shapes. A cal-rod is very heavy, slow to warm-up, and has low surface area with resulting poor heat transfer characteristics.

A ribbon heater is a thin length of resistive material. A ribbon heater has low surface area and cannot be easily integrated with filter media.

A coil heater is a coil of resistive material. A coil heater has low surface area and cannot be integrated with filter media. Thermal growth can cause electrical shorts in coils unless insulated structure is used to keep adjacent coils separated.

Figure 1:
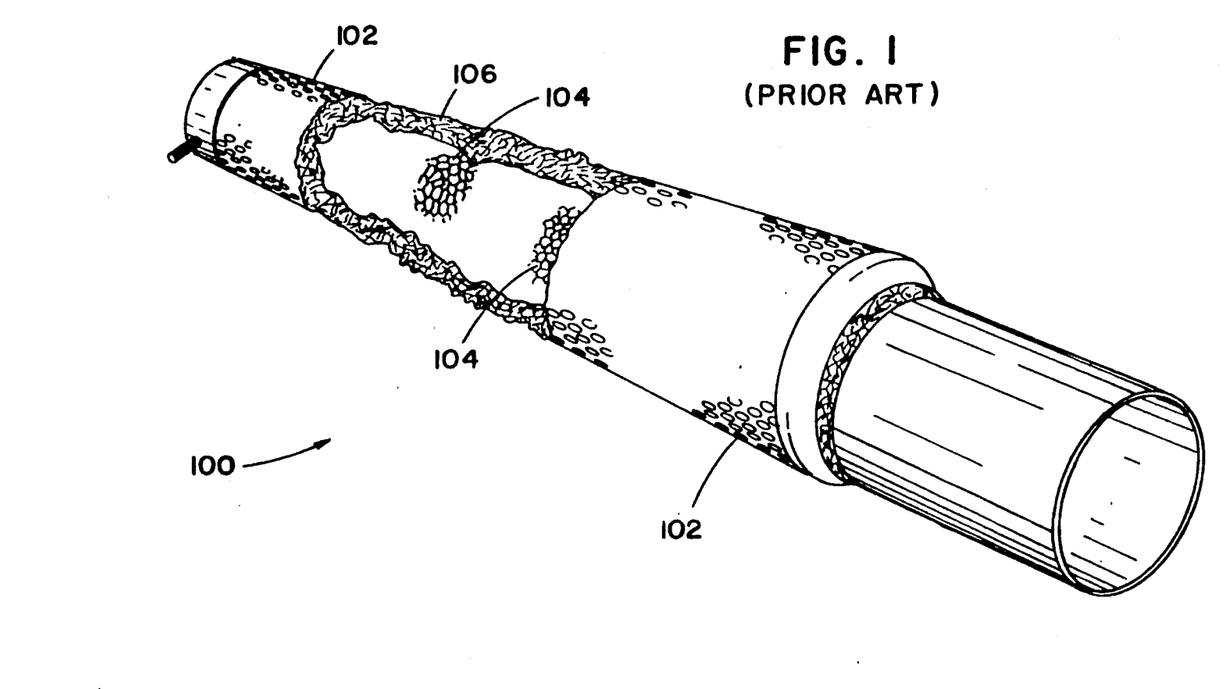
FIG. 1 is a perspective view with a portion cut away showing an expanded metal heater in accordance with prior art.
Figure 2:
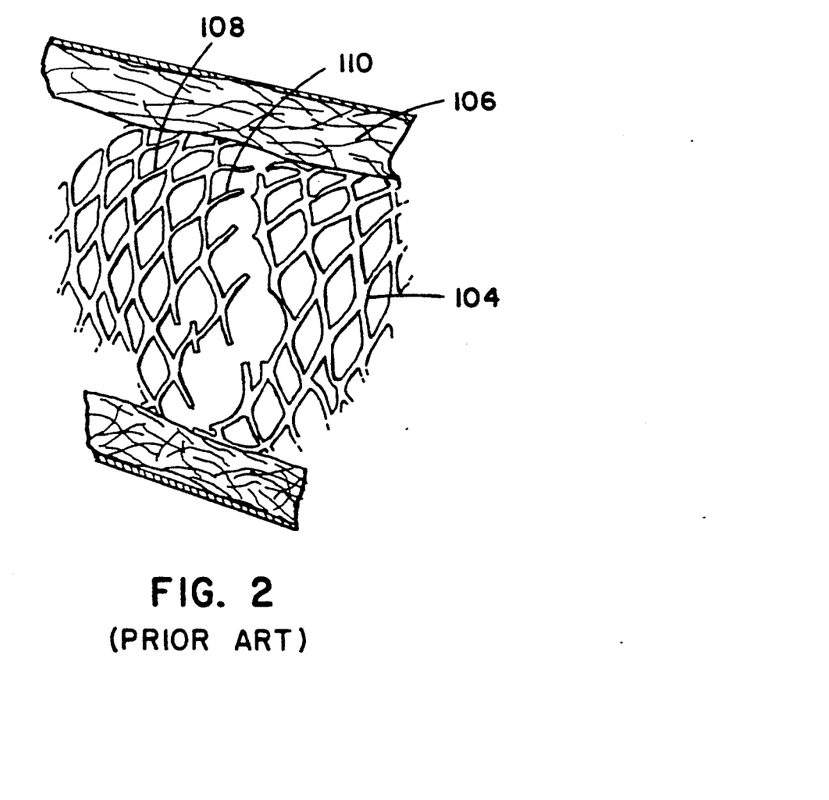
FIG. 2 is an enlarged detail of the expanded metal heater of FIG. 1 showing broken wires.
Figure 3:
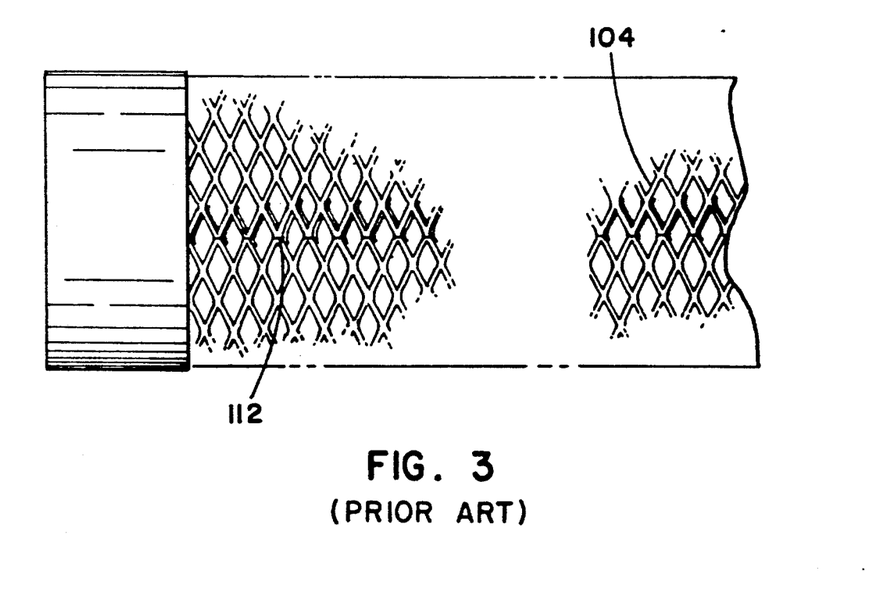
FIG. 3 is a side view of an expanded metal heater of the prior art showing overlapping sides.

An expanded metal heater is shown in FIGS. 1-3. An expanded metal heater has good properties of mass and surface area. It, however, has severe structural deficiencies which lead to high failure rates. In FIG. 1, there is shown a cartridge filter having an expanded metal heater. Briefly, cartridge 100 has a perforated support member 102 and an expanded metal heating element 104 with filter media 106 therebetween. As shown more clearly in FIGS. 2 and 3, the expanded metal heater 104 has sharply notched corners 108. During heat growth and cooling contraction, the sharp corners result in high stress concentrations. Within a relatively few warm-up/cool-down cycles, the high stress often results in breakage of a strand 110. When a first strand breaks, the current paths of adjacent strands receive higher current density causing a higher temperature in the strands which consequently then come under a little more stress. Before long, an adjacent strand breaks, and the process escalates until a few strands have broken. Due to the higher and higher current densities and temperatures, the remainder of the strands eventually fuse open in a melting process. That is, the current density is raised to the point where the temperature of the remaining strands reaches the melting point.

Of further concern in this regard is the region 112 of overlap of one side edge of the expanded mesh over another in order to form the particular shape. Since there are a large number of strands from one end of the expanded wire heating element to the other, it is too costly and difficult to try to match all strands and butt weld them. As a consequence, One side edge is allowed to overlap another and they are spot welded together. The overlapping and spot welding, however, lead to non-uniform current path lengths which can exacerbate current and temperature dissimilarities.

In addition, an expanded metal heater necessarily results in a shape having many parallel resistance paths. Because there are many parallel resistance paths, each path must have proportionately reduced path cross-section in order to meet the total resistance requirement and provide the necessary heat. This results in low structural strength and becomes a factor in the failure problem discussed above.

Also, expanded metal by the very nature of the manufacturing process, results in a diamond shape. The diamond shape reduces current path length from what might otherwise be possible, which is a further reason requiring reduced path cross-section to meet resistance requirements. Further, the diamond shape has a longitudinal stiffness component which does not allow structural flexibility during thermal growth and contraction and is a further factor leading to the failure problem indicated.

The present invention overcomes the limitations of the expanded metal heater and other heaters and results in a heater capable of withstanding the many thousands of warm-up/cool-down cycles required for an acceptable filter cartridge heater.

SUMMARY OF THE INVENTION

The present invention is directed to a filter cartridge for trap apparatus for filtering particulates from exhaust gases of an engine which includes a support member, a heating element, and tubular mechanism for filtering the particulates such that the mechanism is retained between the support member and the heating element. The heating element includes transfers, staggered rows of apertures with an unbroken line lying along a transverse plane of the heating element material between each of a majority of pairs of consecutive of said transverse rows of the apertures.

More particularly, the apertures are preferably slots with radiused corners so that on comparison with the sharp corners of expanded wire, stress levels are distributed and, consequently, substantially reduced. The slots are perpendicular to the direction of electric current and because of staggered spacing, conductive paths having a substantially greater effective length than those of expanded wire heaters are formed and run the length of the heater. As a result, the paths can have much greater cross-section than those of expanded metal.

The heating element of the present invention does not have an unbroken axial structural component. As a consequence, any structural stiffness depends primarily on shear. The heating element then acts much like a spring during thermal growth and contraction and when the heating element is integrated with the filter media and the support member, even with the ends of the heating element fixed, the unit consequently responds to thermal growth and contraction with relatively lower amount of stress, even considering its close structural and thermal contact with other fixed support members at much reduced temperatures. Furthermore, the unbroken line of material along transverse planes provides significant hoop strength so that even as longitudinal change occurs, the filtering material maintains necessary shape. In this way, the present heating element stands up to the higher regeneration duty cycle required for modular filter cartridge traps and survives the thousands of warm-up/cool-down cycles.

The present heating element is generally formed as a cylinder, but can have other shapes. In any case, the side edges of a flat stamping of the heater are butt welded or slightly lapped and welded. Apertures are easily matched at the side edges and, consequently, significant dissimilarities of current pathways as with expanded metal heaters is avoided and all electrical pathways are similar. In other words, since pathways match, the seam can be overlapped slightly and resistance welded, resulting in matched ends, which cannot be done easily with the random strands of expanded mesh.

Thus, the heating element of the present invention has the desirable characteristic of more durability than known heaters because of the stronger cross-sectional members and lower axial stiffness. Furthermore, the heating element maintains the desirable characteristics of high surface area and low mass, both of which lead to fast heater warm-up and efficient heat transfer.

DETAILED DESCRIPTION OF THE PREFERRED EMBODIMENT

Figure 4:
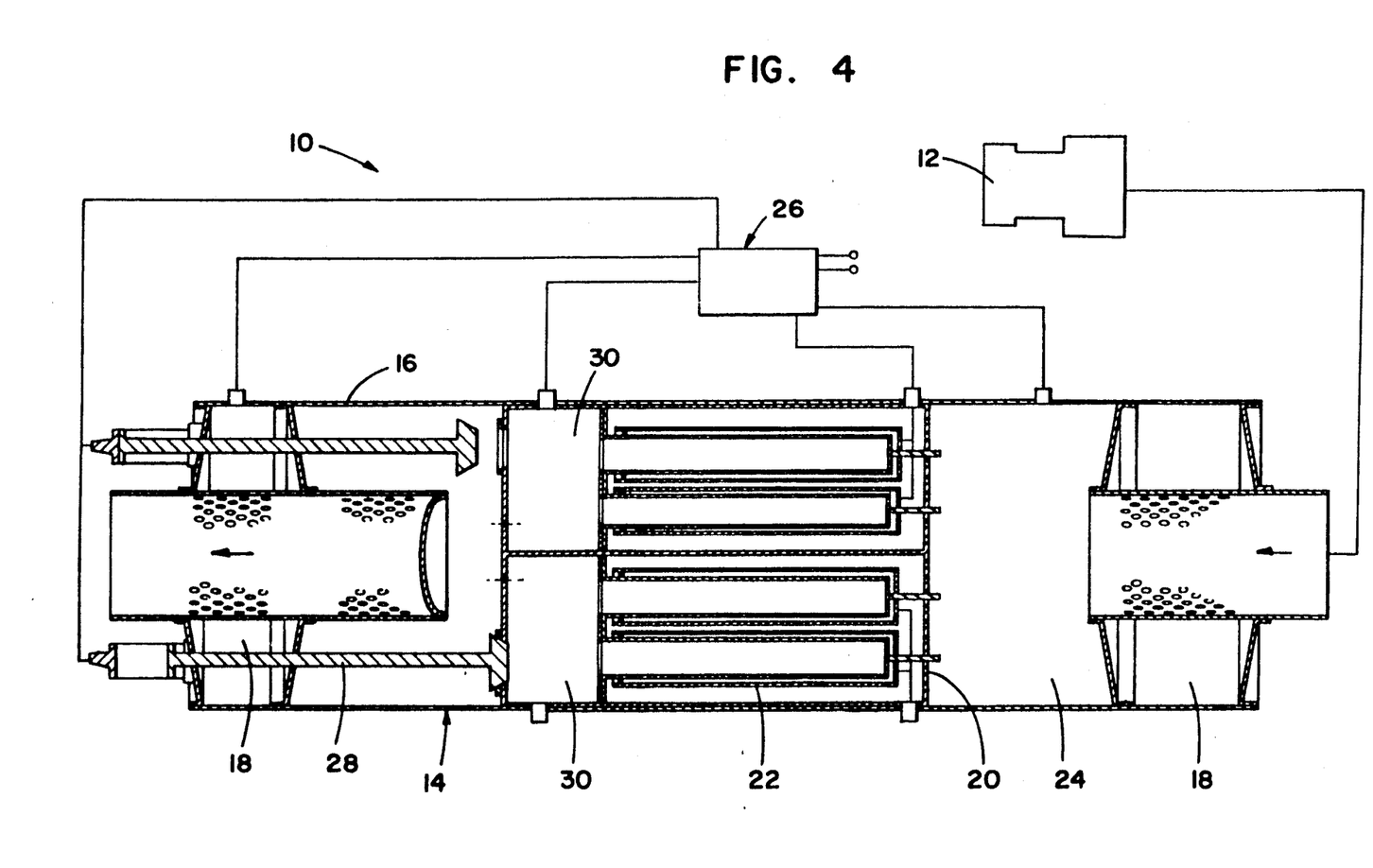
FIG. 4 schematically depicts an engine exhaust system including representative trap apparatus in cross-section showing filter cartridges in accordance with the present invention.

Referring now to the drawings wherein like reference numerals designate identical or corresponding parts throughout the several views, and more particularly to FIG. 4, a system for processing exhaust gases from an engine in accordance with the present invention is designated generally by the numeral 10. System 10 is in fluid communication with engine 12 to receive exhaust gases for processing through trap apparatus 14. Trap apparatus 14 includes a housing 16 having reactive acoustic elements 18 at opposite ends with structure 20 for supporting a plurality of filter cartridges 22 in the space 24 therebetween. Regeneration mechanism 26 includes poppet valves 28 so that segments 30 of space 24 can be variously closed to the exhaust gases during regeneration, while cartridges in other segments continue to filter. Regeneration mechanism 26 includes electrical communication with a power source as known to those skilled in the art. System 10 is disclosed in detail in U.S. patent application Ser. No. 07/722,598, filed Jun. 27, 1991, herein incorporated by reference.

Figure 5:
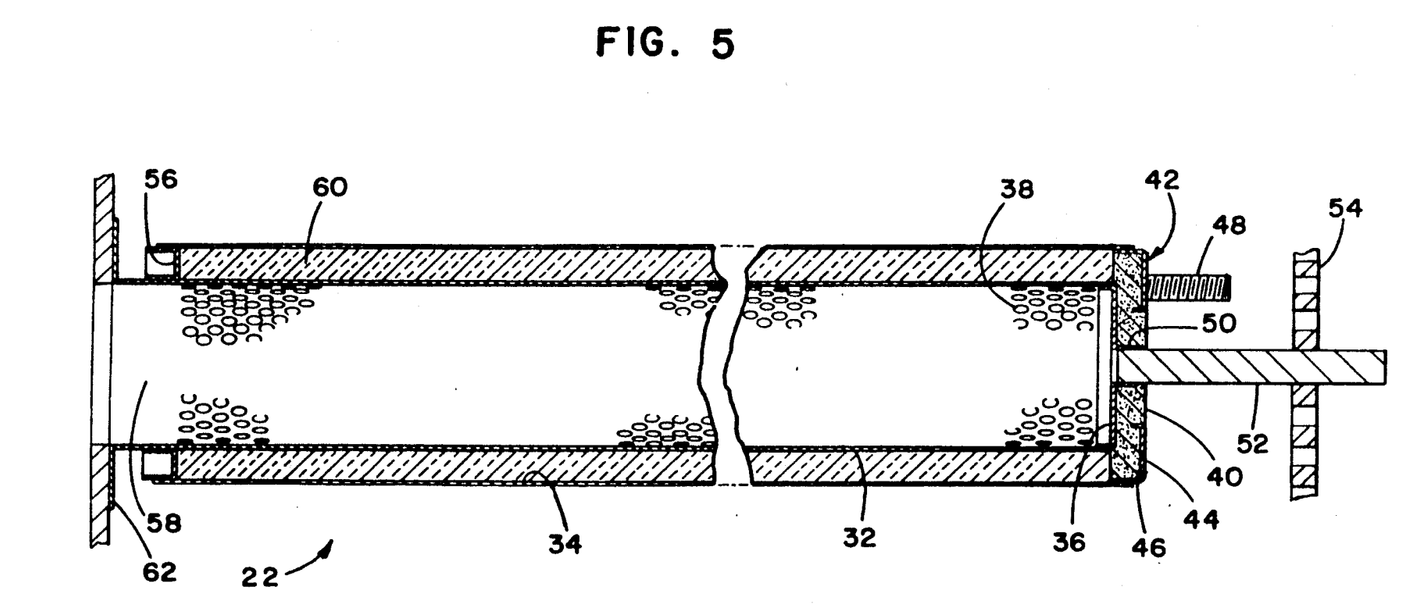
FIG. 5 is a cross-sectional view of a filter cartridge having an external heater in accordance with the present invention.

A filter cartridge 22 in accordance with the present invention is shown in more detail in FIG. 5. Cartridge 22 includes a longitudinally-extending, support member 32 inside a longitudinally-extending, heating element 34 with tubular mechanism in the form of filter media for filtering particulates retained therebetween. Support member 32 is a perforated tube with a closure cap 36 fastened at upstream end 38. An insulating disk 40 provides closure for the upstream end of heating element 34. A metallic ring member 42 having a ring portion 44 and a flange portion 46 is fastened to disk 40 so that ring portion 44 faces outwardly. Flange portion 46 is fastened to heating element 34 such that the inside surface of insulating disk 40 is in contact with closure member 36. A lug 48 or other electrical contact mechanism is fastened to ring portion 44 and is available for receiving electrical energization from the system power source, usually the vehicle battery or electrical system alternator.

Closure member 36 includes a centered outwardly extending flange 50 which extends into a centrally located opening in insulating disk 40. A rod 52 extends through the opening in disk 40 and is fastened to flange 50. Rod 52 provides upstream mechanism for connecting cartridge 22 with structure 54 of trap apparatus 16.

A solid spacer 56 having a U-shaped cross-section fastens support member 32 and heating element 34 together at downstream end 58. Spacer 56 provides closure for the space between support member 32 and heating element 34 so that exhaust gases flow outside in through the slots in heating element 34, pass through the filter media 60, and exit through perforations of support member 32.

Support member 32 is often cylindrical, but could have a variety of other shapes as well. It includes perforations to allow passage of exhaust gases. Support member 32 is commonly made of a metallic material having sufficient structural strength to satisfy the structural requirements of filter cartridge 22. The downstream end of support member 32 provides a mechanism for connecting with trap apparatus 16 in the form of a flange 62 for mating with an appropriate baffle plate in trap apparatus 16. Assuming the baffle plate of apparatus 16 provides an electrical ground, heating element 34 need not include a lug or other electrical contact at the downstream end, since electrical continuity to ground is established through flange 62 of support member 32 and spacer 56 to the downstream end of heating element 34. Although rod 52 may also be grounded, it is insulated from the downstream end of heating element 34 by insulating disk 40.

The filtering mechanism may be constructed of various filter media 60. More particularly, filter tubes may be constructed with ceramic fiber yarn, a woven matting from ceramic fiber or a non-woven random array of fibers entangled together or bonded with a separate binder into mat, or ceramic foams.

Figure 6:
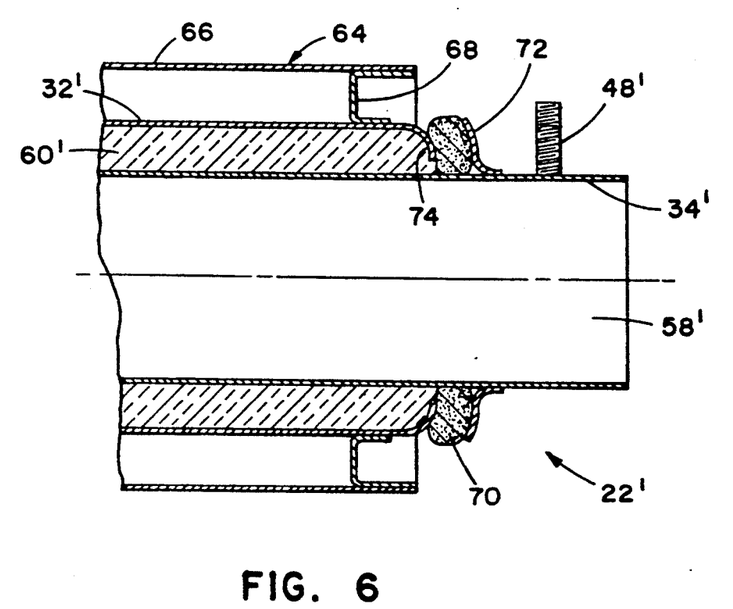
FIG. 6 is a cross-sectional view of an end portion of a filter cartridge having an internal heater in accordance with the present invention.

Filter cartridge 22 of FIG. 5 is disclosed with support member 32 internal of heating element 34. The reverse configuration is equally applicable. As shown in FIG. 6, filter cartridge 22' includes heating element 34' internal of support member 32' with filter media 60, therebetween. Support member 32' is part of a cartridge support mechanism 64. Support mechanism 64 includes a jacket tube 66 spaced outwardly from support member 32' by a spacer 68 having a solid U-shaped cross-section at the upstream end and non-solid spacer brackets (not shown) at the downstream end. The space between tube 66 and support member 32' is open to the exhaust of trap apparatus 16. In this way, filtered exhaust gases are provided a flow path from the filter cartridge to the exhaust of the trap apparatus.

Support member 32' and heating element 34' are electrically connected together at the downstream end (not shown) and there is a closure element (not shown) across heating element 34'. In this way, the downstream end can be grounded to trap apparatus 16. At the upstream end 58', a ring of insulating material 70 separates support member 32' and heating element 34'. Insulating ring 70 is slightly compressed between a collar 72 fastened to heating element 34' and an inward lip 74 formed at the upstream end of support member 32'. Lug 48' is fastened to heating element 34' to provide the mechanism for receiving electrical energization.

As with support member 32 and heating element 34, support member 32' and heating element 34' have openings therethrough to provide exhaust gas flow. Filter media 60' is of a type mentioned with respect to filter media 60. Upstream and downstream mechanism for connecting with trap apparatus 16 connects with filter cartridge 22' at the upstream and downstream ends of support mechanism 64, preferably connecting with jacket tube 66.

Figure 7:
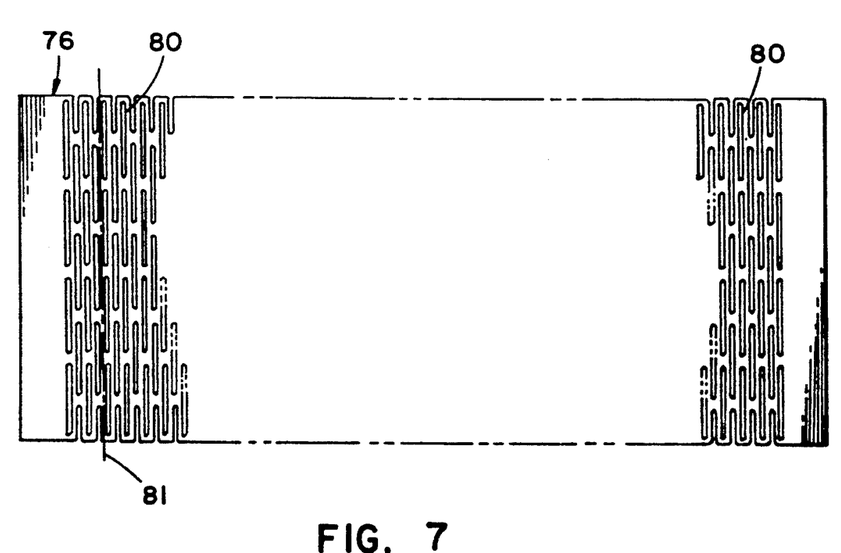
FIG. 7 is a plan view of a flat sheet of a type used to make a heating element in accordance with the present invention.
Figure 8:
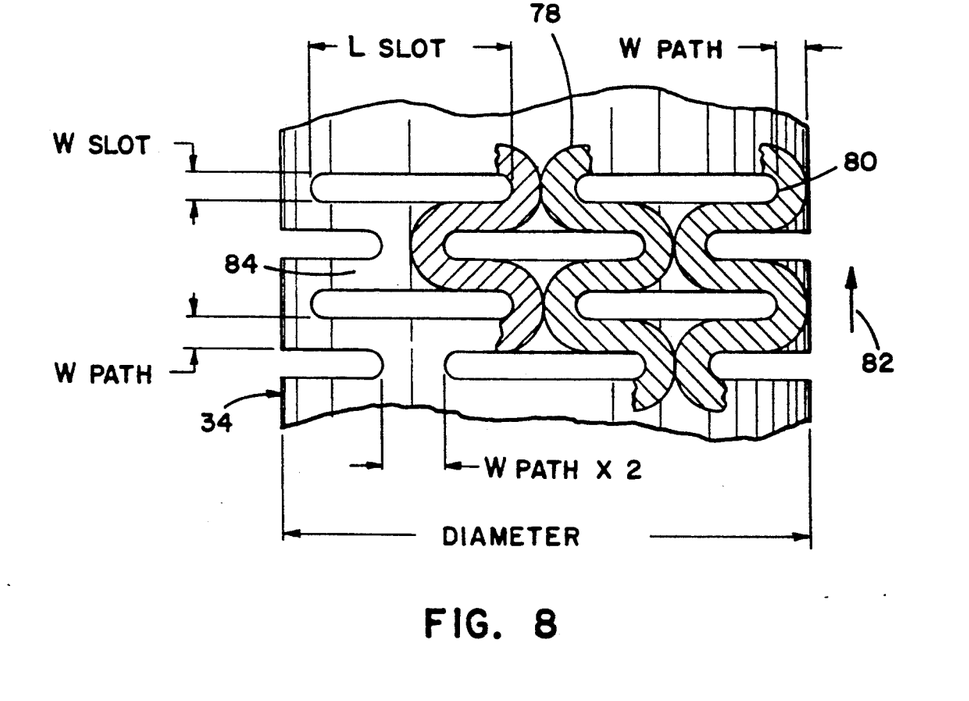
FIG. 8 is a side view of a portion of a heating element depicting current paths.
Figure 9:
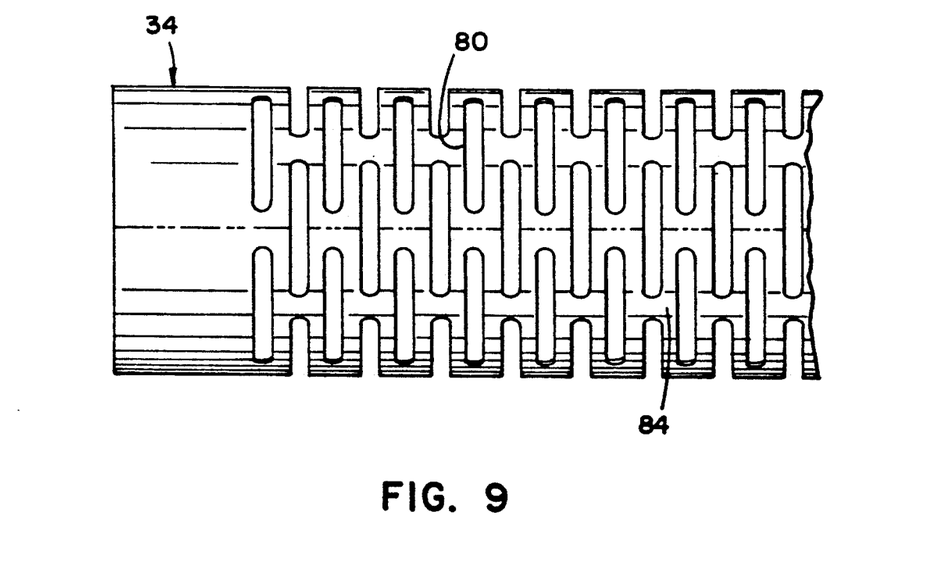
FIG. 9 is a side view of a portion of a heating element in accordance with the present invention.

A heating element of the type represented by elements 34 and 34' is shown in FIGS. 7-9. Designating the heating element of FIG. 9 by numeral 34, it is observed that FIG. 7 shows a flat sheet 76 of electrically conductive material which can be formed into heater 34, while FIG. 8 depicts various electrical paths of a portion of heating element 34.

Electric heater 34 is a resistance heater having mechanism for receiving electrical energization between opposite ends as described hereinbefore with respect to the present type of filter cartridge. Heating element 34 includes transverse, staggered rows of apertures, as shown in the form of slots 80 in the figures, with an unbroken line 81 between consecutive rows lying along a transverse plane of the conductive material. Similar unbroken lines of material lie between each of at least a majority of pairs of consecutive transverse rows of apertures. Preferably, all apertures are arranged in rows such that unbroken lines of material are present between all consecutive rows as shown in FIG. 7. In this way, a plurality of electrical pathways are formed between the opposite ends of the heating element. Furthermore, structural pathways in the transverse direction have significant non-zero transverse force resisting vectors, while in the longitudinal direction structural pathways have near-zero longitudinal force resisting vectors. The result is that the heating element may show thermal growth and contraction in the longitudinal direction, while it will maintain significant hoop strength in the transverse direction thereby yielding longitudinally to prevent the type of failure which occurs with expanded metal heaters, while maintaining strength transversely to provide necessary shape as indicated. Thus, it is critical to the present invention that there be an unbroken line of material lying along a transverse plane. Furthermore, it is important and preferred that all longitudinal lines between opposite ends of heating element 34 are broken by the openings of various apertures.

Apertures in the form of slots 80 are perpendicular to the direction of electric current, as shown by arrow 82 in FIG. 8. Slots 80 preferably have a length to width ratio of at least 2 in order to provide necessary strength and resistance characteristics. Slots 80 are shown elongated with facing, equally radiused, semicircular ends. Slots 80 are further characterized in that they have a pair of facing, parallel, transverse edges. It is understood, however, that the apertures of the present invention may have a different shape as long as the unbroken transverse line of material is maintained. Preferably, however, all corners are radiused, that is, each aperture has an endless, continuous edge. In this way, stresses are distributed and not focused on a sharp corner as in an expanded wire heater.

Slots 80 in each transverse row are aligned, while consecutive rows have the slots staggered from one another. In this way, there are no rigid axial structural members. That is, longitudinal structural pathways each have at least a portion where there is a near-zero longitudinal force resisting vector. There are, however, rigid transverse structural members. That is, there are transverse structural pathways with all portions having a significant non-zero force resisting vector. As a consequence, heater 34 has substantial hoop strength; it has, however, much lower axial stiffness. Any axial stiffness results from resistance to shear. With the opposite ends of the heating element structurally fixed, as they are in filter cartridge 22 of FIG. 5, heating element 34 having these characteristics is free to function much like a spring during thermal growth and contraction. In this way, stress levels around each slot are kept at a low level and breakage at a bridge 84 (the likely failure point for expanded metal heaters) has a low probability.

Due to the staggered slots, multiple conductive paths 78 are formed between the opposite ends of heating element 34. The slot width, path width, and number of radial slots, along with the resistive properties of the material being used, and the overall dimensions (width, length, thickness) of the heater, determine the resistance, surface area, and mass of heating element 34. In other words, the basic dimensions of heating element 34, diameter and length, are often predetermined based on the application. Furthermore, available electrical power, voltage, and engine airflow depend on the vehicle. The needed resistance can therefore be obtained from:

$$R = \frac{E^2}{P}$$

where R=total resistance, E=voltage, and P=available power. The dimensional properties of the heater which can then be manipulated to obtain the resistance for a given heater material, diameter, and length are:

$N_{slots}$=Number of slots per row
$W_{slot}$=Width of each slot (axial)
$W_{path}$=Width of conducting path
T=Heater material thickness With these values chosen, remaining dimensions can be calculated. During design, these indicated values can be varied to determine effect on the calculated dimensions. For descriptive purposes, the dimensions refer to the heater in its flat sheet form 76 (before rolling into a tubular form). For the purpose of this exemplary calculation, current path cross-section is taken to be uniform as depicted in FIG. 8. This requires that the given path width that exists between slots in the axial direction, must be doubled at the bridge 84 between slots in the tangential direction where two paths converge, so there are ($2 \times N_{slots}$) paths in the circumference. This design guideline then establishes the slot length as:

$$L_{slot} = \frac{D \times \pi}{N_{slots}} - 2 \times W_{path}$$

where D is heater diameter. The number of rows of the heater length is given by:

$$N_{rows} = \frac{L}{W_{slot} + W_{path}}$$

where L is heater length. To calculate the overall resistance of the heater, the current path length is calculated for each slot, multiplied by the number of rows, then all paths are combined as parallel resistances.

The current path length is assumed to follow the centerline of the path width as it follows the perimeter of each slot. Path length per slot is given by:

$$L_{perslot} = \frac{(L_{slot} - W_{slot}) + (W_{slot} + W_{path}) \times \pi - (W_{slot} + W_{path}))}{2}$$

Total path length is:

$$L_{perpath} = L_{perslot} \times N_{rows}$$

The cmil area is the conductive path cross-section:

$$A_{cmil} = W_{path} \times T \times 1273236.467$$

where T is heater thickness. Resistance per path is:

$$R_{perpath} = \rho \times \frac{L_{perpath}}{12 \times A_{cmil}}$$

where $\rho$ is heater material density. Total resistance is:

$$R_{total} = \frac{R_{perpath}}{N_{paths}}$$

Variables Influence on Design Characteristics

Each variable's effect is described below based on changing it and adjusting the other variables to maintain the resistance desired for the particular application. In general, the characteristics influenced behave according to:

Structural: Greater number of slots per row, wider path width, and greater material thickness increase the axial stiffness. Greater thickness also increases the radial stiffness. Longer slots and thinner cross-section reduce the axial and radial stiffness.

Heat transfer: Lower mass decreases heater warm-up time. Greater surface area improves heater's heat rejection.

Produceability: Very thin paths are difficult to stamp and can result in wider resistance variations for a given dimensional tolerance range. Too few slots per row can reduce the heater's stability.

Variables Effect on Other Parameters

Number of slots per row: Increasing the number of slots per row decreases the slot length and increases the number of current paths. This requires that the path width and/or the material thickness be reduced to attain the same resistance.

Structurally, this increases the axial stiffness which is undesirable. Decreasing the material thickness lowers the radial stiffness, which is also undesirable. The number of slots selected should be kept as small as possible, but should allow at least 2 axial bridges per row so that the heater can be wound with the filter fiber.

Slot width: Increasing slot axial width decreases the overall path length which requires that the path width and/or the material thickness and the number of slots per row be reduced to attain the same resistance. Structurally, this has the same effect as described above.

Path width: Increasing path width requires fewer slots per row and/or thinner material. Axial stiffness is increased. Surface area and mass are increased.

Material thickness: Increasing thickness requires fewer slots and/or thinner cross-section. Axial and radial stiffness is increased.

In general, resistance is obtained with longer effective current path lengths than is possible with expanded metal heaters. This is possible since there is little longitudinal path component. Furthermore, as is apparent from the above analysis, the present invention can attain necessary performance while allowing flexibility in a number of parameters with respect to a final design. Thus, the invention is adaptable to many sizes, shapes, power requirements, and can be manipulated for a given power requirement to yield a range of surface areas, masses, and path cross-sections to be adaptable to specific needs. It is understood, therefore, that the disclosure is representative and that equivalents are possible. Changes made, especially in matters of shape, size, and arrangement are understood to be within the principle of the invention to the full extent extended by the general meaning of the terms in which the appended claims are expressed.

What is claimed is:

1. A filter cartridge for trap apparatus for filtering particulates from exhaust gases of an engine, comprising:
 a longitudinally-extending, support member having upstream and downstream ends with upstream and downstream means, respectively, for connecting with said trap apparatus for being supported thereby;
 a longitudinally-extending, heating element made from electrically conductive material, said heating element having means for receiving electrical energization between opposite ends, said heating element having opposite side edge portions fastened together between said opposite ends, said heating element including transverse, staggered rows of apertures, each said rows forming a pair with the row on one side of it and another pair with the row on the other side of it, said heating element further including an unbroken line lying along a transverse plane of said material between a majority of said pairs; and
 tubular means for filtering said particulates, said tubular filtering means being retained between said support member and said heating element;
 wherein a plurality of electrical pathways are formed between said opposite ends and said line of said material provides significant hoop strength without resulting in significant longitudinal rigidity.

2. The cartridge in accordance with claim 1 wherein said heating element includes an average electrical pathway width between said apertures of each pair of said majority of pairs of consecutive of said transverse rows of apertures, said heating element further including a bridge having bridge width between consecutive apertures in each row of about twice said average width, wherein said electrical pathways have a relatively uniform width between said opposite ends.

3. The cartridge in accordance with claim 1 wherein said apertures include a first pair of facing, parallel, transverse edges.

4. The cartridge in accordance with claim 3 wherein said apertures further include a second pair of facing, equally radiused edges.

5. The cartridge in accordance with claim 4 wherein said first and second pairs form an endless, continuous perimeter.

6. The cartridge in accordance with claim 1 wherein said apertures are slots having a length to width ratio of at least 2.

7. A filter cartridge for trap apparatus for filtering particulates from exhaust gases of an engine, comprising:
 a longitudinally-extending, support member;
 a heating element having means for receiving electrical energization between opposite ends spaced-apart a longitudinal length, said heating element having a plurality of electrical pathways between said opposite ends and structural pathways with significant non-zero transverse force resisting vectors and near-zero longitudinal force resisting vectors;
 means for connecting said support member and said heating element with said trap apparatus for being supported thereby, said connecting means including means for holding said heating element to maintain said length constant; and
 tubular means for filtering said particulates, said tubular filtering means being retained between said support member and said heating element.

8. A filter cartridge for trap apparatus for filtering particulates from exhaust gases of an engine, said trap apparatus having available for trap regeneration a predetermined electrical power source having a predetermined voltage, said cartridge comprising:
 a longitudinally-extending, support member having upstream and downstream ends with upstream and downstream means, respectively, for connecting with said trap apparatus for being supported thereby;
 a longitudinally-extending, heating element, said heating element being in electrical communication at first and second ends with means for receiving electrical energization from said power source, said electrical energization between said first and second ends resulting in conducting paths having an average width, said heating element having thickness and longitudinal and transverse surface dimensions, said heating element also including a plurality of slots, said slots being aligned in rows and having an average width; and
 tubular means for filtering said particulates, said tubular filtering means being retained between said support member and said heating element;
 said heating element having electrical resistance as limited by said power source and heat needed during regeneration to ignite particulates on said tubular filtering means, said heating element as limited by said longitudinal and transverse surface dimensions and said resistance being configured depending on heating element material density, number of slots per row, average slot width, average conducting path width, and heating element thickness.

* * * * *

UNITED STATES PATENT AND TRADEMARK OFFICE
CERTIFICATE OF CORRECTION

PATENT NO. : 5,224,973

DATED : July 6, 1993

INVENTOR(S) : Bruce B. Hoppenstedt et al.

It is certified that error appears in the above-identified patent and that said Letters Patent is hereby corrected as shown below:

```
Column 4, line 50, after "centered" insert--,--.

Column 5, line 24, replace "60" with--60'--.

Column 6, line 4, after "of" (third instance) insert--
    the--.

Column 7, line 20, after "determine" insert--the--.

Column 9, line 18, after "each" insert--of--.

Column 9, line 37, after "of" insert--the--.
```

Signed and Sealed this

Thirty-first Day of May, 1994

*Attest:*

BRUCE LEHMAN

*Attesting Officer*     *Commissioner of Patents and Trademarks*